UNITED STATES PATENT OFFICE.

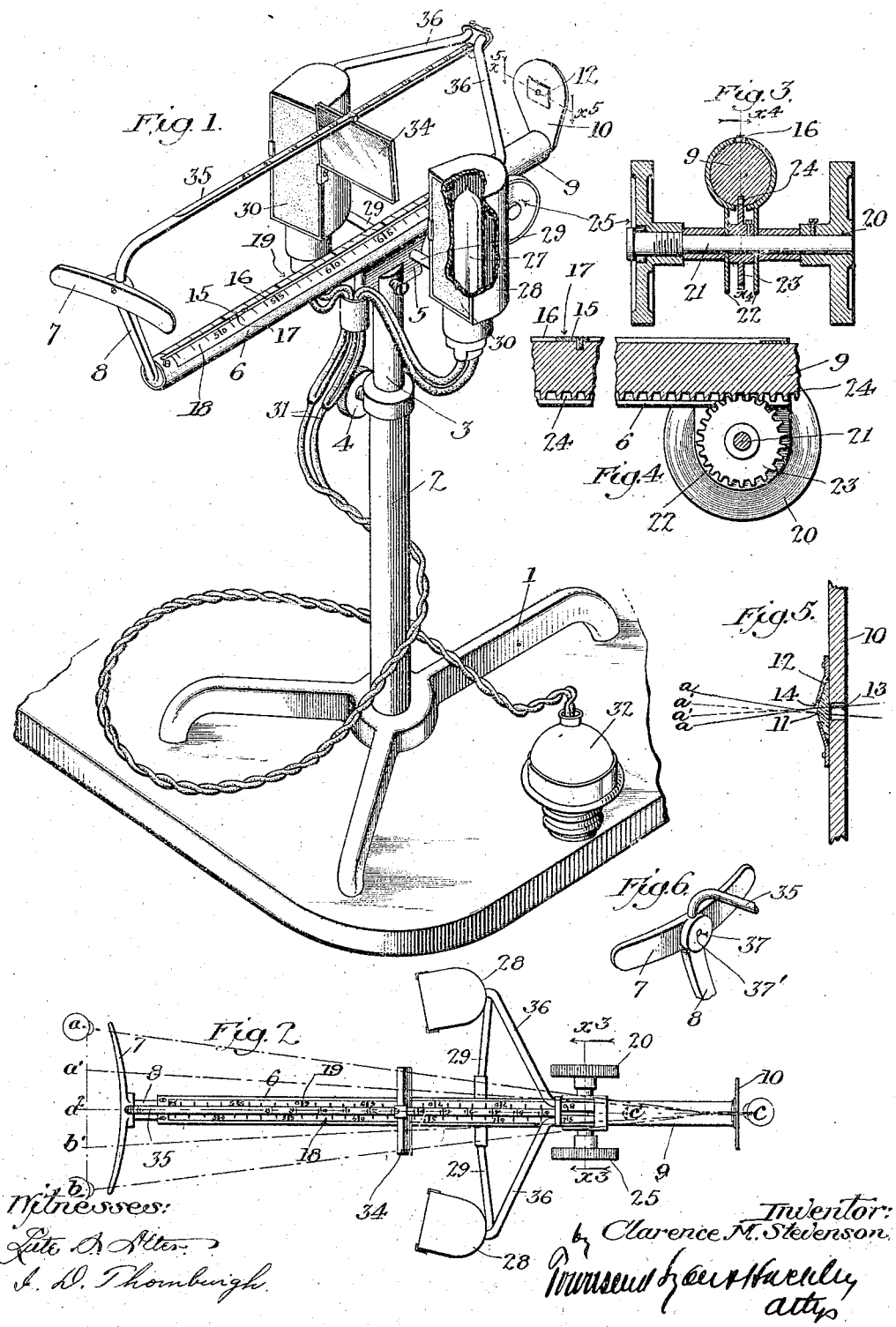

CLARENCE M. STEVENSON, OF LOS ANGELES, CALIFORNIA.

DEVICE FOR MEASURING INTERPUPILARY DISTANCE.

1,014,917.      Specification of Letters Patent.      Patented Jan. 16, 1912.

Application filed March 2, 1911. Serial No. 611,893.

*To all whom it may concern:*

Be it known that I, CLARENCE M. STEVENSON, a citizen of the United States, residing at Los Angeles, in the county of Los Angeles and State of California, have invented a new and useful Device for Measuring Interpupilary Distance, of which the following is a specification.

This invention relates to means for measuring the distance between the pupils of the eyes of a person in order to facilitate the accurate fitting of eye-glasses or spectacles.

One object of the invention is to provide means whereby the interpupilary distance may be measured accurately and conveniently.

Another object of the invention is to provide a device for this purpose in which the distance may be measured correctly when the eyes are in the position for which the glasses are adapted, so as to take account of the approximation of the pupils for a short distance focus, as in reading-glasses.

Other objects of the invention will appear hereinafter.

The accompanying drawings illustrate the invention, and referring thereto:

Figure 1 is a perspective of the device with parts broken away. Fig. 2 is a plan thereof. Fig. 3 is a vertical section on line $x^3$—$x^3$ Fig. 2. Fig. 4 is a transverse section on line $x^4$—$x^4$ in Fig. 3. Fig. 5 is a horizontal section on line $x^5$—$x^5$ in Fig. 1. Fig. 6 is a perspective of a target serving as means for fixing the position of the patient's eyes.

1 designates a stand or base for supporting the instrument, the base being provided with a post 2 in which telescopes a vertical bar 3 which may be clamped at any desired elevation in said post by a set screw 4, said bar 3 carrying at its upper end a head 5 on which is mounted a horizontal bar or member 6 serving as a scale member for the instrument. At one end of this bar 6 is provided a head rest or means for engagement with a part of the face of a person, for example, the forehead, said means consisting of a cross bar 7 mounted on a bar 8 extending upwardly from the horizontal bar 6. The said bar 6 is tubular or provided with a longitudinal bore in which slides a horizontal slide member 9 provided on the end opposite to the arm 8 with an upwardly extending bar or plate 10 supporting a double or birefringent prism 11, said prism being held in place by a fastening plate 12, said plates 10 and 12 being provided with perforations 13 and 14 which are opposite one another so as to provide for the passage of light to said double prism. The perforate members 10 and 12 with the double prism constitute an eye-piece through which the observer looks in making the measurement. Said double prism comprises two prism portions tapering either way from a central vertical plane, said central vertical plane passing through the axis of the perforations 13 and 14. Said slide member 9 is further provided with an upwardly extending lug or projection 15 engaging and sliding in a longitudinal slot 16 in the horizontal member 6, this projection being provided with a mark 17 adapted to read on scales 18, 19 on the member 6 at the respective sides of the slot 16. The member 9 is moved longitudinally within the tubular member 6 by means of a manual operating device, such as a thumb wheel 20 carried by a shaft 21 rotatably mounted in bearings 22 on the member 6, said shaft carrying a gear wheel 23 engaging with a rack 24 on the member 9. Said member 6 may also be provided with a thumb wheel 25 screwing on shaft 21 and engaging with one of the bearings 22 to clamp the parts in set position.

Means are preferably provided for illuminating the eyes to be observed, said means consisting, for example, of electric lamps 27 contained in reflector cases 28 supported on arm 29 on the head 5, said cases being provided with translucent front plates 30 and said lamps being connected to electric supply wires 31 leading to a connecting plug 32 for connection to any suitable source of current. Means are also preferably provided for bringing the eyes to a definite convergence or focal distance, said means consisting, for example, of a mirror 34 slidably mounted on a longitudinal bar 35 extending above the bar 6, said bar 35 being, for example, secured to the bar 8 at one end and to arms 36 at the other end, said arms extending from the lamp cases 28 aforesaid. A target 37 is provided on the back of head rest 7 having a center mark or depression 37'.

The operation is as follows: A person whose interpupilary distance is to be measured, places his forehead against the bar 7, the position of the eyes being indicated at $a$, $b$, in Fig. 2, and the mirror 34 being placed at a point on the scale bar 35 corresponding to one-half of the focal distance required. Thus, if the eye-glasses are to be used at thirteen inches focal distance, the mirror is placed at six and one-half inches from the bar 7. Said person looks at the image in the mirror of the center mark 37', thereby bringing his eyes to the same convergence as if he were looking at an actual object at the distance for which the glasses are to be fitted. The observer places his eye in the position indicated at $c$ in Fig. 2, and looking through the double prism 11 observes the apparent position, say of the inner edges of the pupils, at $a$. On account of the refraction by the double prism the rays, indicated at $a$, $c$, from $a$ to the eye at $c$, will be deflected as indicated at $a'$, $c$, so as to become more nearly parallel or less convergent, so that the observer sees visual images of $a$, $b$ at $a'$, $b'$, and the distance $a$—$a'$ is proportional to the distance $a$—$c$ between the observer's eye and the eyes being observed. The images referred to are those produced by the rays of light passing from each of the patient's eyes through the prism at the other side of the center, such rays being refracted toward the center of the double prism and giving the effect, therefore, of an image which is deflected inwardly from the object. In addition to these virtual images which are closer together than the object observed, other images are produced which are farther apart than said objects, these outer images being due to the refraction of the rays from each eye which pass through the portion of the prism at the same side. These outer images are, however, disregarded in reading the apparatus, only the inner images being observed. The observer now moves the eye-piece and double prism forward or back by means of the manual operating device 20 until the inner edges of the pupils for the two visual images coincide, this position of the visual images, indicated at $a^2$, $b^2$ being, therefore, on the longitudinal axis or central line $a^2$—$c$ of the instrument. If $c'$ be the adjusted position of the observer's eye at this time, it being understood that the observer moves his eye so as to follow up the double prism in its change of position, then the distance from $c$ to $c'$ is dependent on the linear distance $a$—$a^2$. Therefore, by calculation or observation, a scale may be formed on the fixed member 6 whose readings on the movable member 16 will indicate the distance $a$—$a^2$ or preferably twice that distance which is the interpupilary distance. Such a scale, for example, is indicated at 18.

It will be understood that the scale 18 is laid out to represent the interpupilary distances corresponding to the longitudinal movement of the eye-piece with relation to the head rest or means for fixing the location of the patient's eyes, and the scale 18 therefore does not represent the actual motion of the slide member, but represents this motion multiplied by a certain factor dependent on the angle of deflection by the double prism and also to some extent on the convergence of the patient's eyes as determined by the target 37 and mirror. The scale 18 may thus be laid off to represent the interpupilary distance for the standard or normal position of the eyes in reading, the mirror being adjusted to that position. The other scale 19 on the scale member may be laid off to represent the interpupilary distances for distance-glasses, where the eyes are looking at a distant object. Or, if desired, the scale 18 may be laid off as an actual scale in centimeters, for example, and the actual interpupilary distance corresponding thereto may be determined by suitable charts, tables or formulæ.

The above described movable mirror, in connection with the supporting scale member therefor and the indicator or target 37, may also be used for other purposes, for example, in ascertaining the power of convergence or accommodation of the eyes to a given focus, the mirror being moved to different positions and the patient being instructed to look at the indicator or target 37 with both eyes and the observer or examiner noting the point at which the power of concentrating both eyes on the same point ceases.

What I claim is:

1. A device for measuring interpupilary distance comprising means for fixing the location of the eyes to be measured, an eye-piece movably relatively to the aforesaid means, and scale means for measuring the movement of said eye-piece relatively to the aforesaid means; said eye-piece being provided with ray deflecting means for producing virtual images of the observed eyes when viewed from the eye-piece, said virtual images being shifted proportionally to the movement of the eye-piece relatively to the observed eyes.

2. A device for measuring interpupilary distance comprising a head rest, ray deflecting means mounted to move relatively to said head rest, and scale means for indicating the relative movement of said ray deflecting means and said head rest.

3. A device for measuring the distance between pupils of a person, comprising a head rest, a double prism, means for movably mounting said double prism relatively to said head rest, and a scale means for indicating the relative movement of said double prism and head rest.

4. A device for measuring interpupilary distance comprising a head rest, a scale member connected thereto, a slide member mounted to move longitudinally on said scale member, and an eye piece on said slide member provided with a double prism.

5. The combination of a head rest, an indicator thereon, a scale member extending from said head rest, and a mirror movably mounted on said scale member and facing said indicator, whereby the eyes of a person located by said head rest may be positioned to definite focal distance by observation of said indicator in said mirror.

6. A device for measuring interpupilary distance comprising a head rest, a scale member connected thereto, a slide member mounted to move longitudinally on said scale member, an eye piece on said slide member provided with a double prism, and illuminating means supported in position to direct light toward the head rest.

7. A device for determining the distance between pupils of a person comprising a head rest, a double prism, means for movably mounting said double prism relatively to said head rest, a scale means for indicating the relative movement of said double prism and head rest, a target adjacent to the head rest, a scale member extending parallel to the line of relative motion of the double prism and head rest, and a mirror mounted to move on said scale means.

In testimony whereof, I have hereunto set my hand at Los Angeles, California, this 11th day of February, 1911.

CLARENCE M. STEVENSON.

In presence of—
ARTHUR P. KNIGHT,
FRANK L. A. GRAHAM.